May 20, 1952  P. G. J. M. AUDEMAR  2,597,050
HYDRAULIC TRANSMISSION FOR REPRODUCING
MECHANICAL MOTIONS AT REMOTE POINTS
Filed July 11, 1947  8 Sheets-Sheet 1

INVENTOR
PIERRE GUILLAUME JOSEPH MARIE AUDEMAR
BY Otto Munk
HIS ATTY

May 20, 1952  P. G. J. M. AUDEMAR  2,597,050
HYDRAULIC TRANSMISSION FOR REPRODUCING
MECHANICAL MOTIONS AT REMOTE POINTS
Filed July 11, 1947  8 Sheets-Sheet 3

INVENTOR
PIERRE GUILLAUME JOSEPH MARIE AUDEMAR
BY Otto Munk
HIS ATTY

May 20, 1952

P. G. J. M. AUDEMAR 2,597,050

HYDRAULIC TRANSMISSION FOR REPRODUCING
MECHANICAL MOTIONS AT REMOTE POINTS

Filed July 11, 1947

INVENTOR
PIERRE GUILLAUME JOSEPH MARIE AUDEMAR
BY Otto Munk
HIS ATTY

INVENTOR
PIERRE GUILLAUME JOSEPH MARIE AUDEMAR
HIS ATTY

Patented May 20, 1952

2,597,050

UNITED STATES PATENT OFFICE 2,597,050

HYDRAULIC TRANSMISSION FOR REPRODUCING MECHANICAL MOTIONS AT REMOTE POINTS

Pierre Guillaume Joseph Marie Audemar, La Garenne-Colombes, France, assignor to Olaer Marine, Paris, France, a company of France Application July 11, 1947, Serial No. 760,481
In Germany June 25, 1942

2 Claims. (Cl. 60—54.5)

The present invention aims to provide improved hydraulic transmissions of the kind comprising, at the sending station, a plurality of pistons individually displaceable in corresponding cylinders and operatively connected, as by eccentrics, crank pins or the like, with their driving shaft or shafts at this station, and hereinafter termed as sending pistons or cylinders, and at the receiving station a plurality of similar cylinders and pistons similarly connected with their driven shaft or shafts at this station and hereinafter termed as receiving pistons or cylinders, said sending and receiving cylinders being interconnected two and two by means of suitable conduits, said conduits and the corresponding portions of said sending and receiving cylinders being filled up with a suitable operative medium under pressure and provided with means for controlling pressures prevailing therein, said means being arranged to cause said medium to flow into its source from said conduits and cylinder portions in case of overpressures and from said source back into said conduits and portions in case of underpressures, the whole enabling said driving shaft or shafts when rotated to cause said driven shaft or shafts to rotate in the desired sense and in strict synchronism therewith.

According to one feature of the present invention there is provided a hydraulic transmission which comprises at least three sending cylinders and pistons and at least three corresponding receiving cylinders and pistons, said sending and receiving cylinders being interconnected two and two by means of suitable conduits, said conduits and the corresponding end portions of said cylinders being filled up with a suitable liquid under pressure, each one of said conduits being connected, on one hand, with the inlet end of a relief valve and, on the other hand, with the outlet end of an admission valve, the outlet ends of the three relief valves being branched into a common manifold opening, through a spring-loaded check valve, into the source of said liquid so that the latter may escape from each one of said conduits in case of overpressures occurring therein, and the inlet ends of the three admission valves being branched into a common manifold opening directly into said source of liquid so that the latter may flow freely back into said conduits in case of underpressures occurring therein.

According to a further feature of the present invention there is provided a hydraulic transmission which comprises a pair of mutually inclined sending cylinders and pistons operatively connected, as by crank pin, eccentric or the like, with their common driving shaft, and a pair of similar receiving cylinders and pistons similarly connected with their common driven shaft, the head end of each sending cylinder being connected by a suitable conduit with the back end of the corresponding receiving cylinders, each one of said conduits being connected, on one hand, with inlet end of a relief valve and, on the other hand, with the outlet end of an admission valve, the outlet ends of the four relief valves being branched into a common manifold opening, through a spring-loaded check valve, into the source of the operative medium so that the latter may escape from each one of said conduits in case of overpressures occurring therein, and the inlet ends of the four admission valves being branched into a common manifold opening directly into the source of said medium so that the latter may flow freely back into said conduits in case of underpressures occurring therein.

According to yet a further feature of the present invention there is provided a hydraulic transmission which comprises a driving shaft, at least three sending cylinders and pistons operatively connected with said shaft, a driven shaft, at least three similar receiving cylinders and pistons similarly connected with said driven shaft, suitable conduits interconnecting said sending and receiving cylinders two by two, a source of operative medium under pressure filling up said conduits and the corresponding volumetric portions of said cylinders, relief valves connected each with one of said conduits and opening into a relief manifold communicating with said source either through a spring-loaded check-valve or directly through a suitable by-pass, admission valves connected each with one of said conduits and opened into an admission manifold communicating directly with said source, and means whereby the circulation of said operative medium may involve only said source, by-pass, manifolds, relief and admission valves and sending cylinders, so as to prevent any rotation of said driven shaft while the said driving shaft keeps on rotating, or may involve also said receiving cylinders so as to cause said driven shaft to rotate in one sense or the other.

According to yet a further feature of the present invention there is provided a hydraulic transmission which comprises two groups of sending cylinders and pistons, each group being operatively mounted on a rotating auxiliary shaft, a suitable intermediate mechanism causing both shafts when in operation to rotate continuously in opposite directions, a driving shaft geared to said mechanism, two corresponding similar groups of receiving cylinders and pistons, each group being operatively mounted on a rotated auxiliary shaft, a similar intermediate mechanism causing both rotated shafts to rotate continuously in opposite directions, a driven shaft geared to said similar intermediate mechanism, suitable conduits interconnecting two by two the sending and receiving cylinders of two corresponding groups, a source of operative medium under pressure filling up said conduits and the corresponding volumetric portions of said cylinders, relief valves connected each with one of said conduits and opening into a relief manifold communicating with said source through a suitable check valve, and admission valves connected each with one of said conduits and opening into an admission manifold communicating directly with said source, said medium being thus enabled continuously to circulate so as to make up for any overpressures and underpressure that may occur in said conduits and volumetric portions of the corresponding cylinders, the said groups being thus constantly ready to effect the desired transmitting operation from said driving shaft to said driven shaft.

Further features of the present invention will be apparent from the following description and appended claims. The invention will be described with reference to the accompanying diagrammatic drawings which show, by way of example, some embodiments thereof, and in which:

Referring to Figs. 1 to 6, by 1 is designated the driving shaft actuated for example by means of a crank 3, whilst by 1a is designated the driven shaft.

Figures 1, 2, 3:
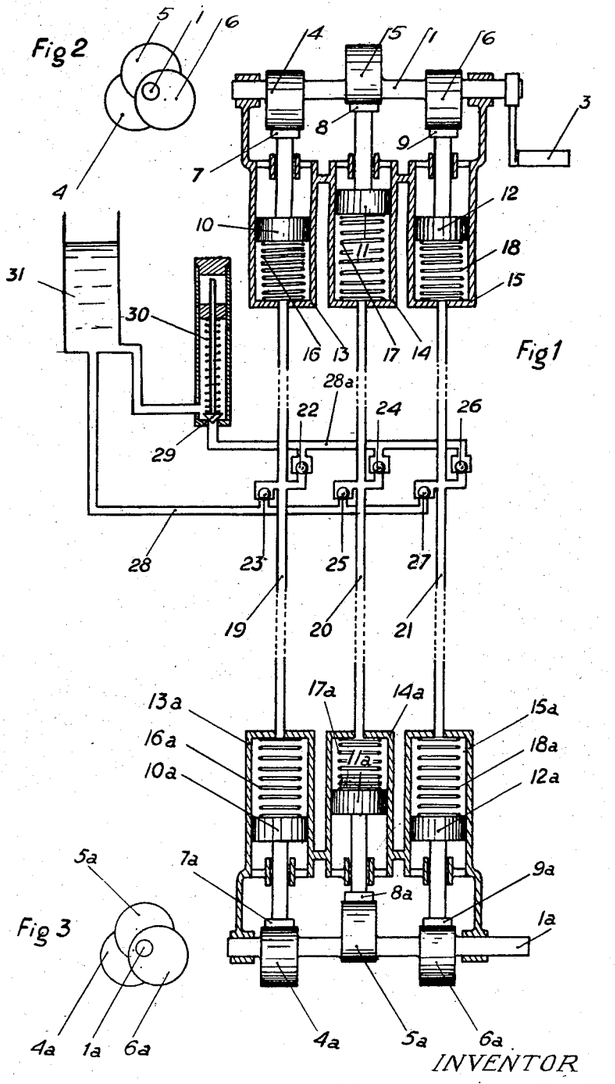
Fig. 1 is a sectional view showing a form of hydraulic transmission according to the present invention.
Figs. 2 and 3 are partial side views of apparatus of Fig. 1 looking along the driving and driven shafts, respectively.

Keyed to the driving shaft 1, and shifted through 120° with respect to one another, are three eccentrics 4, 5, 6 cooperating with pushers 7, 8, 9 of pistons 10, 11, 12, respectively, which pistons are displaceable in cylinders 13, 14, 15 and may be urged outwards by springs 16, 17, 18, respectively.

Similarly, the driven shaft 1a carries eccentrics 4a, 5a, 6a adapted to actuate pistons 10a, 11a, 12b through the medium of pushers 7a, 8a, 9a, respectively. The eccentrics 4a, 5a, 6a are keyed to the driven shaft 1a and shifted similarly to the eccentrics 4, 5, 6 (Figs. 2 and 3). The pistons 10a, 11a, 12a are displaceable in cylinders 13a, 14a, 15a and may be acted upon by springs 16a, 17a, 18a, respectively. Corresponding sending and receiving cylinders are interconnected by means of conduits 19 (between the cylinders 13 and 13a), 20, (between the cylinders 14 and 14a) and 21 (between the cylinders 15 and 15a). The conduit 19 is provided with a relief valve 22 and an admission valve 23. Similarly, the conduits 20 and 21 are provided with relief valves 24, 26 and admission valves 25, 27, respectively. All said relief valves open into a manifold 28a having at one of its ends a check valve 29 opening in the same sense as the valves 22, 24, 26 and acted upon by a suitably calibrated spring 30, so as to set the manifold 28a in communication with a reservoir of operative liquid 31, while all said admission valves open into a manifold 28 communicating directly with said reservoir of liquid 31.

The operation is as follows: the driving shaft 1 when rotated by the crank 3 causes said liquid, with which are filled up the manifolds 28a—28, conduits 19, 20, 21 and adjoining volumetric portions of said sending and receiving cylinders, to operate the receiving pistons so as to cause the driven shaft 1a to rotate in synchronism with the driving shaft 1, provided that the pressures in the operative liquid distributing system remain substantially unchanged. This, however, is not always the case, for said pressures may undergo changes due to various factors, such for example as leakages along said pistons or elsewhere in said system, air pockets casually formed therein, and the inertia of said liquid that must be overcome after a standstill of the apparatus. It is for neutralizing said factors that the above valve mechanism is called forth to serve. Indeed, in case of overpressures, due for example to the inertia of operative liquid, this liquid may escape from the conduits 19, 20, 21 through the relief valves 22, 24, 26 into the manifold 28a and from this through the check valve 29 into the reservoir 31, wherefrom it may return freely, through the manifold 28 and admission valves 23, 25, 27, into said conduits to make up for any underpressure occurring therein. Practically, a mere revolution of the driving shaft 1 is sufficient to cause the driven shaft 1a to rotate in absolute synchronism with the said driving shaft.

Figures 4, 5, 6:
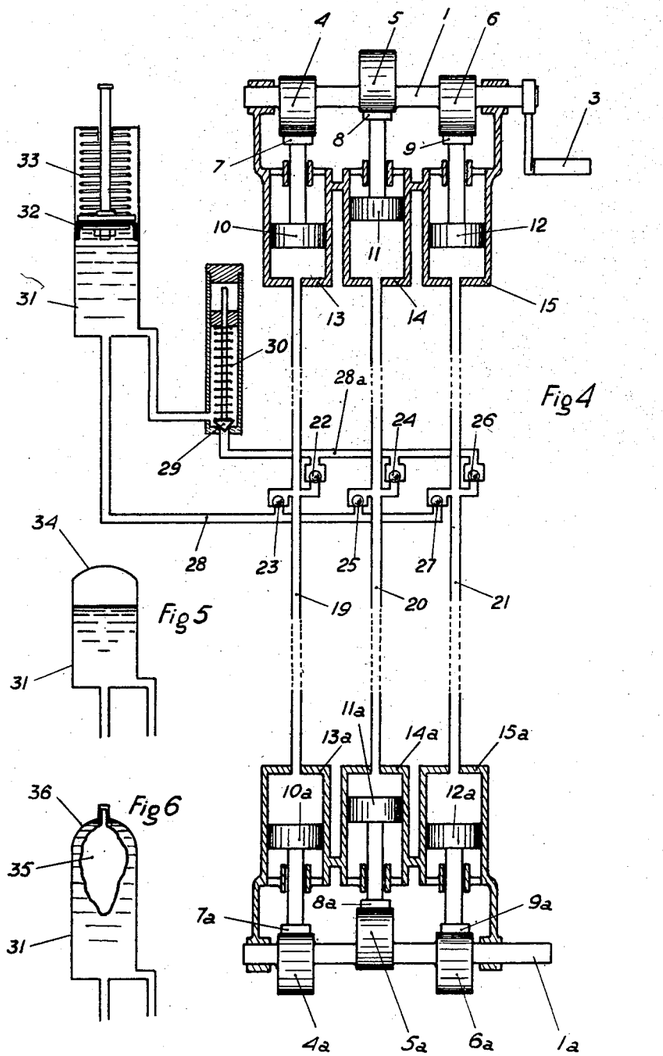
Fig. 4 is a modified form of apparatus of Fig. 1.
Figs. 5 and 6 are minor details of apparatus shown in Figs. 1 and 2.

The pressure reservoir 31 may be open into the surrounding atmosphere as shown in Fig. 1, or may be closed by means of a tight movable cover 32 urged downwards by a spring 33 as shown in Fig. 4, or it may be of the closed type having a layer of air at its top as shown in Fig. 5. It may further be of the closed type having at its top 36 a flexible pocket 35 containing a suitable gas under pressure.

Figure 7:
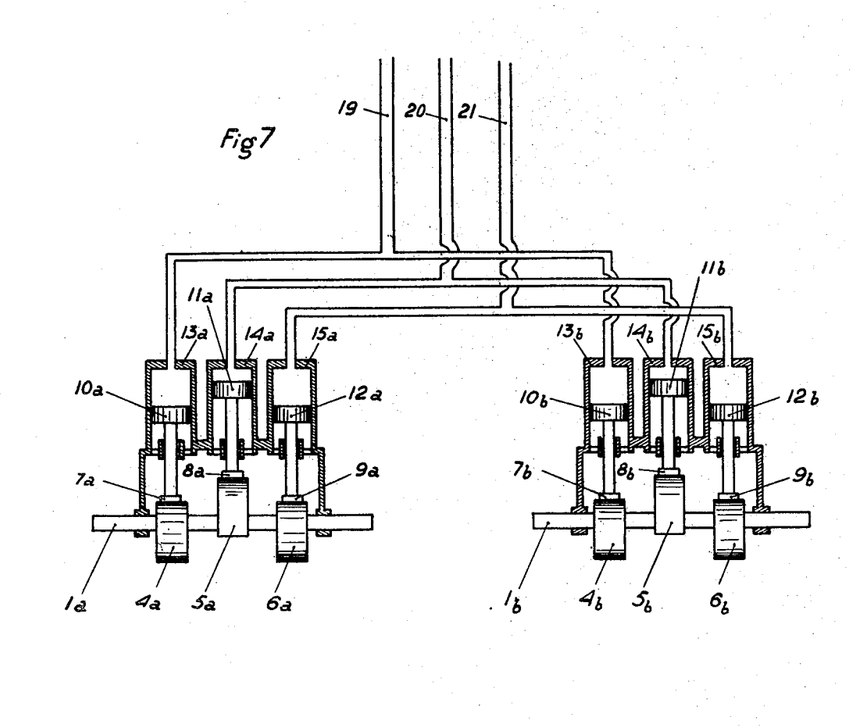
Fig. 7 is a further modified form of apparatus shown in Figs. 1 and 4.

Obviously, the sending cylinders and pistons as well as the operative liquid distributing system of Figs. 1 to 6 may be arranged to drive not only the sole driven shaft 1a as shown in these figures, but simultaneously also at least one additional shaft 1b as is illustrated in Fig. 7.

Figure 8:
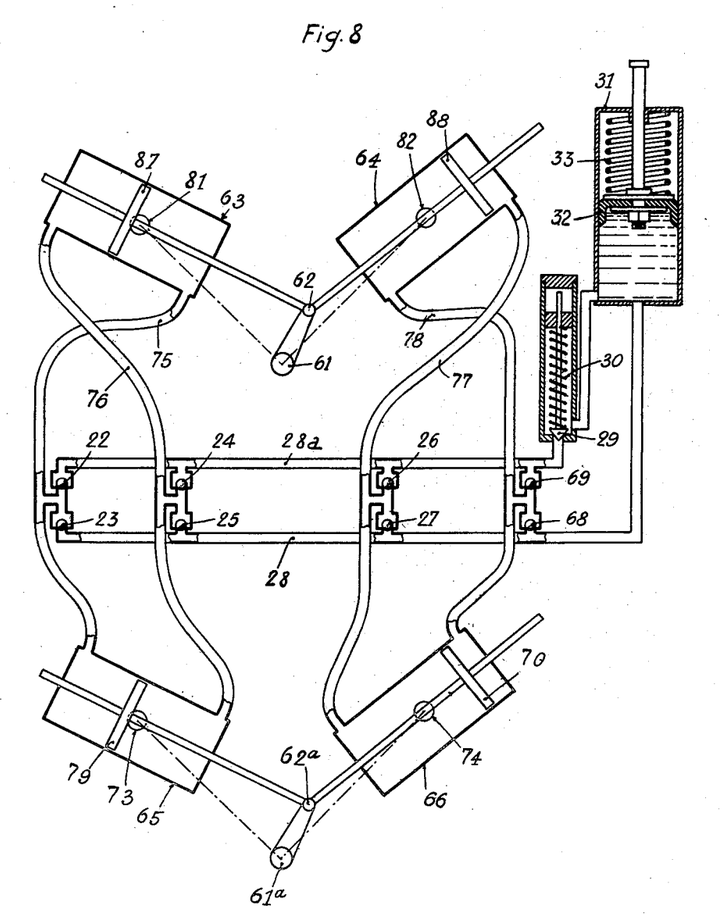
Fig. 8 shows a further form of hydraulic transmission according to the invention.
Figure 9:
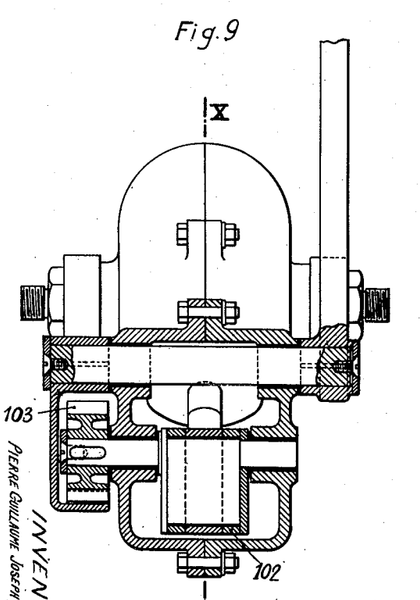
Figs. 9, 10, 11 and 12 show yet a further form of hydraulic transmission according to the invention, Fig. 10 being a section on line X—X of Fig. 9, and Figs. 9 and 12 being sections on lines IX—IX and XII—XII, respectively, of Fig. 10.
Figure 10:
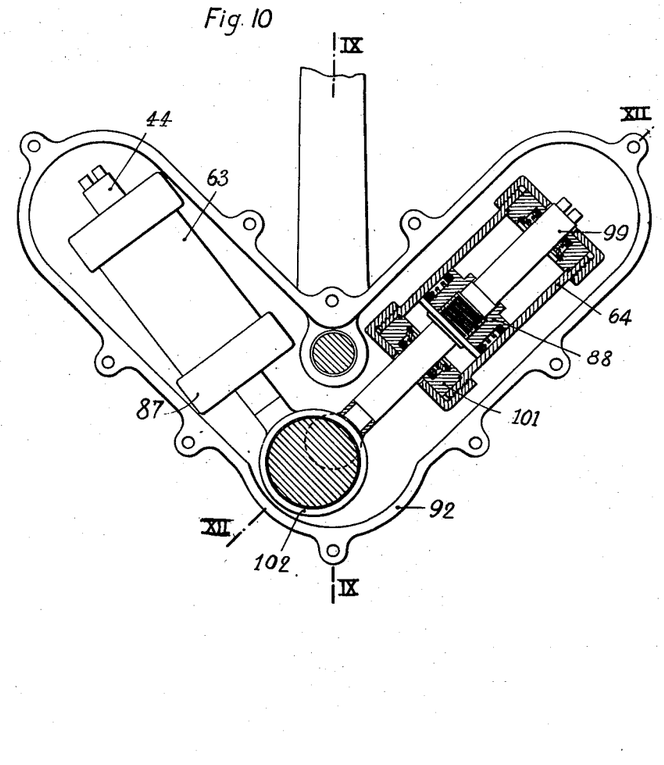
Figure 11:
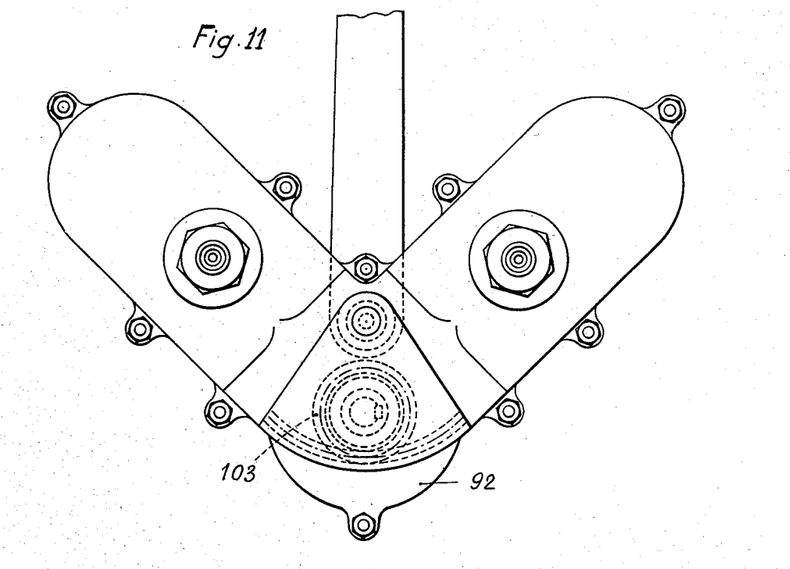
Figure 12:
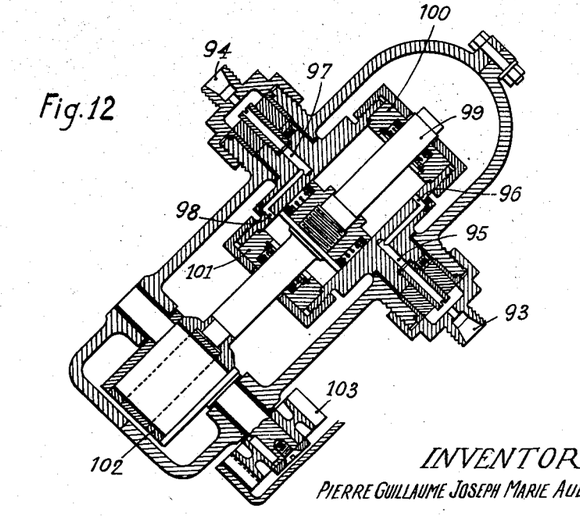

Referring to Fig. 8, by 61 and 61a are designated the driving and driven shafts, respectively, and by 62 and 62a the corresponding crank pins. Designated by 63 and 64 are two mutually inclined sending cylinders and by 65 and 66 two similarly inclined receiving cylinders. All said cylinders are adapted to oscillate about transversal axles 81, 82, 73, 74 and have, mounted therein, double-acting pistons 87, 88, 79, 70, respectively. The head ends of sending cylinders 63 and 64 are connected with the rear ends of receiving cylinders 65 and 66 by means of suitable conduits 76 and 77, while the rear ends of cylinders 63 and 64 are connected with head ends of cylinders 65 and 66 by means of suitable conduits 75 and 76. Said conduits are connected each with a relief valve, and the four relief valves 22, 24, 26, 69 open into a relief manifold 28a communicating through a check valve 29 with a reservoir 31 of operative liquid under pressure, said check valve opening in the same sense as the said relief valves and being acted upon by a spring 33 determining the pressure under which the operative liquid may escape from said conduits into the reservoir 31. The conduits 75, 76, 77, 78 are further connected each with an admission valve, and the four admission valves 23, 25, 27 and 68 open into an admission manifold 28 communicating directly with the reservoir 31. The reservoir 31 may be of any suitable type adapted to hold the operative liquid under the desired pressure. In the example shown, it is provided with a tight slidable cover 32 acted upon by a spring 33.

It is readily understandable that with this arrangement any overpressure, due for example to the inertia of operative liquid, this liquid may escape from said conduits through said relief valves into the manifold 28a and therefrom through the check valve 29 into the reservoir 31, wherefrom it may return freely, through the manifold 28 and admission valves, into said conduits to make up for any underpressure occurring therein.

In Figs. 9 to 12, inclusive, is shown a modified form of transmitting and receiving apparatus of Fig. 8. In this case, the transmission comprises a set of mutually inclined sending cylinders 63, 64 and pistons 87 (Fig. 8), 88, and a set of similar receiving cylinders 65, 66 and pistons 70, 79. Each set is mounted in a common casing 92 and its cylinders 63, 64 are shifted through a right angle with respect to each other. The cylinders of each set are adapted to oscillate about transversal axles 81, 82 in a manner indicated in Fig. 8. The rods of pistons 87, 88 of each set are connected to an eccentric 102 mounted on a shaft that may carry a gear 103 meshing with a suitable gear carried by the corresponding driving or driven shaft (not shown). These piston rods have their free ends 99, 104 extended through the corresponding cylinder heads for the purpose of preventing these ends from interfering with corresponding volumes of the operative liquid. The inflow and outflow of said liquid are effected through the passages 93, 95, 96 and 94, 97, 98, the passage 96 opening into the head end portion of each cylinder and the passage 98 into the rear end portion thereof. 100 and 101 are stuffing boxes for preventing leakages of the operative liquid along the piston rods 99, 104.

Hydraulic transmissions made according to Figs. 8 to 12, inclusive, present the maximum of simplicity and the minimum of occupied space, for they call for but two sending and receiving cylinders and pistons, while the foregoing transmissions shown call for three sending and receiving cylinders and pistons. In contrast, they necessitate an additional interconnecting conduit with its relief and admission valves, and somewhat longer manifolds, that may adversely influence the cost of installation and the operation.

Figure 13:
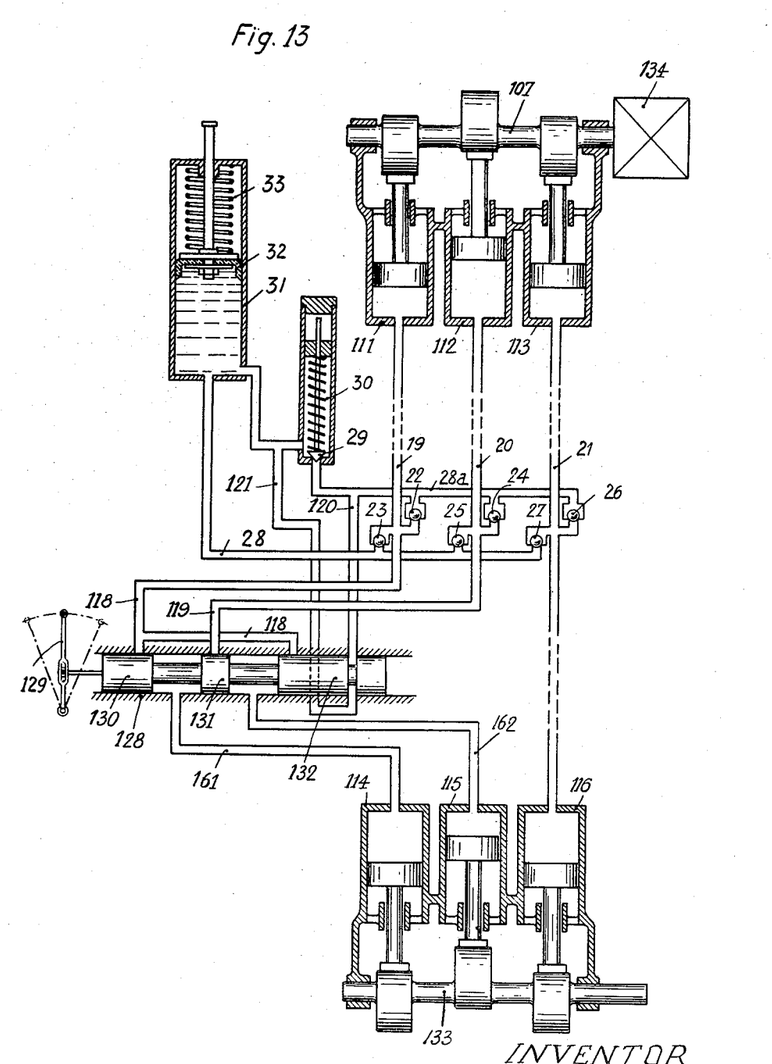
Fig. 13 is a sectional view showing a further form of hydraulic transmission according to the invention.

Shown in Fig. 13 is a hydraulic transmission which differs from that shown in Fig. 1 or 4 in that it includes means whereby the driving shaft may rotate continuously either without causing the driven shaft to rotate or causing the same to rotate in one sense or the other. As in this transmission there are various parts similar to those already described in detail in connection with Figs. 1 and 4, these parts will now be reconsidered summarily inasmuch as is necessary in order that said means may be readily understood.

Shown at 107 is the driving shaft actuated by a motor 134. Designated by 111, 112, 113 are the sending cylinders. 133 is the driven shaft, while 114, 115, 116 are the receiving cylinders. Designated by 19, 20, 21 are the interconnecting conduits. 22, 24, 26 are the relief valves and 28a is their manifold, while 23, 25, 27 are the admission valves and 28 is their manifold. Designated by 29 is the check valve acted upon by a calibrated spring 30, while 31 is the receptacle of operative liquid maintained under pressure by a cover 32 acted upon by a spring 33.

The aforesaid means of the invention may comprise for example a by-pass 120—121 for the purpose of short-circuiting the check-valve 29, and a slide-valve mechanism branched into some of said interconnecting conduits, for example 19 and 20, and operated at will either to let the operative liquid circulate freely through said by-pass, receptacle 31 and manifolds 28a, 28 under the action of the sending cylinders, while preventing the same from penetrating into the receiving cylinders, thereby discontinuing the rotation of the shaft 133, or to let this liquid circulate normally so as to cause the shaft 133 to rotate in one sense, or else to let it circulate so as to cause this shaft to rotate in the other sense.

In its position shown, said slide-valve mechanism cuts off the conduits 19 and 20 by its obturators 130 and 131, respectively, while letting the liquid circulate freely through the by-pass 120—121, wherefore the rotation of the shaft 133 is discontinued. When its control lever 129 is moved to the left, the conduit 19 is set in communication with a conduit 161 and the conduit 20 with a conduit 162, wherefore the shaft 133 is caused to rotate in one sense. When the control lever 129 is moved to the right, a conduit 19—118 is set in communication with the conduit 162, while the conduit 20 is set in communication with the conduit 161, wherefore the shaft 133 is caused to rotate in the other sense.

Figure 14:
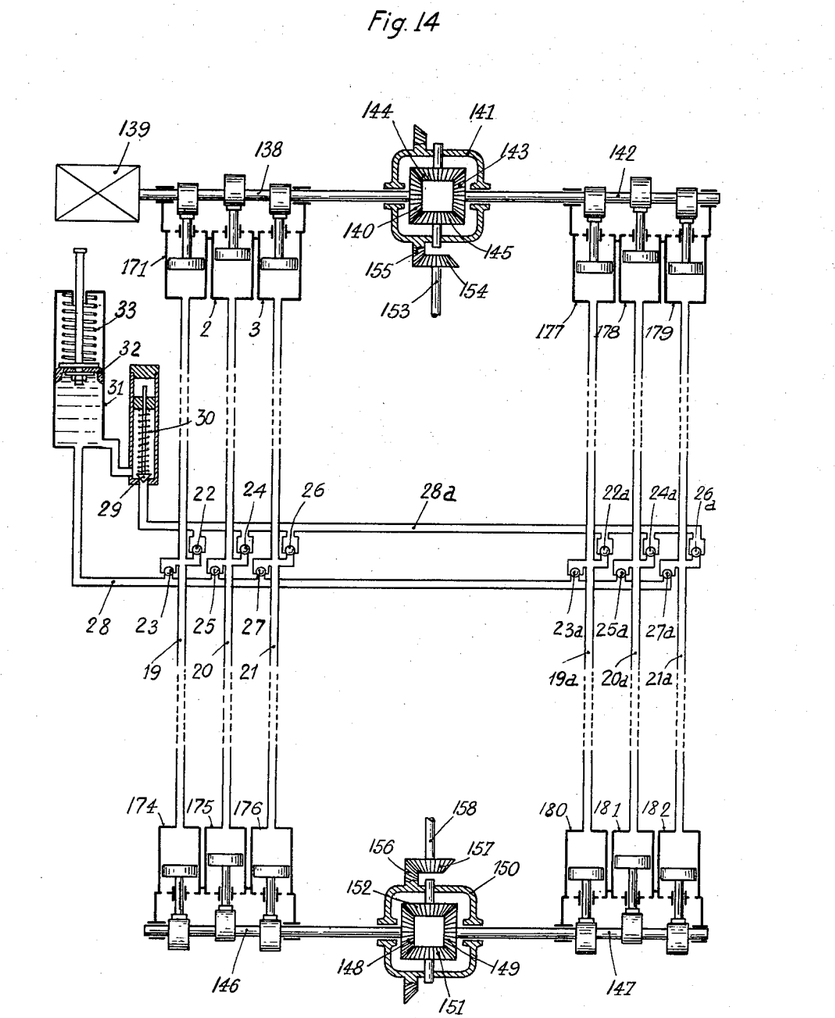
Fig. 14 shows yet a further form of hydraulic transmission according to the invention.

Referring finally to Fig. 14, there is shown a hydraulic transmission particularly suitable for transmitting with great precision slow motions of the driving shaft, and even any desired intermittent motions thereof, for this transmission is so arranged as to avoid any necessity for the driving shaft to overcome the inertia of operative liquid. Indeed, this transmission consists substantially of two groups of sending and receiving cylinders of the character already described, which groups are adapted to operate continuously in opposite directions with the aid of two suitable intermediate mechanisms geared to the driving and driven shafts, respectively, the continuity of operation of the two groups resulting obviously in the absence of the necessity for the driving shaft to overcome the inertia of operative liquid, it being to be noted by the way that the power required for such continuous operation is practically insignificant, having to overcome frictions only.

As in this transmission there are various parts similar to those already described in detail hereinabove, these parts will now be reconsidered summarily inasmuch as is necessary in order that the functioning of this transmission may be readily understood.

Designated by 171, 172, 173 are the sending cylinders of one of said groups, while 174, 175, 176 are the receiving cylinders of this group. 19, 20, 21 are the corresponding interconnecting conduits. The other group has the sending cylinders 177, 178, 179, the receiving cylinders 180, 181, 182 and the interconnecting conduits 19a, 20a, 21a. Designated by 22, 24, 26, 22a, 24a, 26a are the relief valves with their manifold 28a opening through the check valve 29—30 into the receptacle of operative liquid 31, 32, 33, whilst 23, 25, 27, 23a, 25a, 27a are the admission valves with their manifold opening directly into said receptacle. Designated by 138 and 146 are the driving and driven shafts, respectively, of one of said groups, while 142 and 147 are the driving and driven shafts, respectively, of the other group. By 139 is designated a motor continuously driving the shaft 138 in the desired direction. Carried by the shaft 138 is a bevel gear 140 meshing with bevel gears 144, 145, in mesh with the bevel gear 143 carried by the shaft 142 which may thus be caused by the shaft 138 to rotate in the desired directions. These bevel gears are disposed in a casing 141 provided with a bevel crown gear 155 meshing with a bevel gear 154 carried by the main driving shaft 153 whose motion is to be transmitted to the receiving station.

The shafts 146 and 147 are similarly interconnected by means of similar gears 148, 149, 150, 151 disposed in the casing 150 provided with the similar crown gear 156 meshing with the gear 157 carried by the main driven shaft 158.

During operation, when the main driving shaft 153, gears 154, 155 and casing 141 with its associated parts are maintained stationary, the shaft 138, driven by motor 139, and the driven shaft 146, which rotates at the same speed in the same direction as shaft 138, will cause the shafts 142 and 147 to rotate with the same speed in a direction opposed to that of shafts 138 and 146.

If the main driving shaft 153 and hence the casing 141 and its associated parts are now rotated clockwise or anticlockwise, this rotation will be immediately and exactly transmitted through gears 144, 145 and 143, shafts 142 and 147, gears 149, 151 and 152, casing 150 and gears 156, 157 to the main driven shaft 158.

It will be understood that the invention is not limited to the particular apparatus described and shown, for changes may be made therein, without substantially departing from the invention hereof, which is intended to be defined in the accompanying claims, the specific description hereinabove relating merely to some operative embodiments for carrying out the spirit of the invention.

What I claim is:

1. Hydraulic transmission for the purpose of reproducing mechanical motions at points removed from the locality thereof, which includes: a number of sending cylinders and pistons actuated by a driving shaft, a number of corresponding receiving cylinders and pistons actuating a driven shaft, conduits operatively interconnecting the volumetric portions of the corresponding sending and receiving cylinders, a source of operative medium under pressure filling up said conduits and volumetric portions, a relief-valve-mechanism and its manifold communicating through a pressure regulating valve with said source, an admission-valve-mechanism and its manifold communicating directly with said source, means for short-circuiting said pressure regulating valve with respect to said manifolds, and means whereby the circulation of said medium may involve first only said source, short-circuiting means, manifolds, relief and admission valve-mechanisms and sending cylinders, so as to prevent any rotation of the said driven shaft while the said driving shaft keeps on rotating, and then also said receiving cylinders so as to cause the said driven shaft to rotate in the desired sense.

2. Hydraulic transmission for the purpose of reproducing mechanical motions at points removed from the locality thereof, which includes: a number of sending cylinders and pistons actuated by a driving shaft, a number of corresponding receiving cylinders and pistons actuating a driven shaft, conduits operatively interconnecting the volumetric portions of the corresponding sending and receiving cylinders, a source of operative medium under pressure filling up said conduits and volumetric portions, a relief-valve-mechanism and its manifold communicating through a pressure regulating valve with said source, an admission-valve-mechanism and its manifold communicating directly with said source, a conduit short-circuiting said pressure regulating valve between said manifolds, and a slide-valve mechanism branched into some of said interconnecting conduits and operated manually so that the circulation of said medium may involve first only said source, short-circuiting conduit, manifolds, relief and admission valve-mechanisms and sending cylinders, so as to prevent any rotation of said driven shaft while said driving shaft keeps on rotating, and then also said receiving cylinders so as to cause said driven shaft to rotate in the desired sense.

PIERRE GUILLAUME JOSEPH
MARIE AUDEMAR.

REFERENCES CITED

The following references are of record in the file of this patent:

UNITED STATES PATENTS

| Number | Name | Date |
|---|---|---|
| 386,116 | Du Bois | July 17, 1888 |
| 568,736 | Brown | Oct. 6, 1896 |
| 1,382,315 | Philippi | June 21, 1921 |

FOREIGN PATENTS

| Number | Country | Date |
|---|---|---|
| 648,105 | France | Aug. 7, 1928 |
| 895,284 | France | Mar. 27, 1944 |
| 191,783 | Great Britain | Jan. 22, 1923 |
| 519,099 | Great Britain | Mar. 15, 1940 |